United States Patent [19]

Newton

[11] 4,257,479
[45] Mar. 24, 1981

[54] HEAT EXCHANGER AND DRAIN DOWN FOR SOLAR COLLECTOR

[75] Inventor: T. Lawrence Newton, Atherton, Calif.

[73] Assignee: Sunburst Solar Energy Corp., Menlo Park, Calif.

[21] Appl. No.: 26,316

[22] Filed: Apr. 2, 1979

[51] Int. Cl.³ ............................. F28D 7/12; F24J 3/02
[52] U.S. Cl. ............................. 165/156; 126/420; 126/435; 126/437; 165/163
[58] Field of Search ............... 165/156, 163, 164, 168, 165/154; 126/420, 435, 437

[56] References Cited

U.S. PATENT DOCUMENTS

| | | | |
|---|---|---|---|
| 1,951,403 | 3/1934 | Goddard | 126/435 |
| 2,324,257 | 7/1943 | Ekert | 165/156 |
| 2,425,669 | 8/1947 | Brock | 165/156 |
| 3,100,523 | 8/1963 | Marrujo | 165/163 |
| 3,482,625 | 12/1969 | Bray | 165/163 |
| 4,067,314 | 1/1978 | Bollefer | 126/435 |
| 4,082,143 | 4/1978 | Thomason | 126/435 |
| 4,083,490 | 4/1978 | Cunningham et al. | 126/437 |
| 4,108,160 | 8/1978 | Harper | 126/420 |
| 4,130,110 | 12/1978 | Bottum | 126/435 |
| 4,138,996 | 2/1979 | Cartland | 126/420 |

Primary Examiner—James C. Yeung
Assistant Examiner—Daniel O'Connor
Attorney, Agent, or Firm—Julian Caplan

[57] ABSTRACT

A solar collector has a liquid system independent of a household hot water heater system, the two systems transferring heat in a heat exchanger. The heat exchanger has an open top inner tank enclosed in a closed outer tank, a coil connected to the hot water tank system circulates under main pressure in a coil in the annular space between the inner and outer tanks. Liquid from the collector enters at the bottom of the annular space, flows upward around the coil and overflows the top of the inner tank. A pump draws liquid from the bottom of the inner tank for circulation through the solar collector system. The liquid in the collector system drains by gravity into the inner tank at any time that the collector circulating pump is not operating, thus providing freeze protection during all normal operations and also at such time that a power failure may occur.

7 Claims, 3 Drawing Figures

HEAT EXCHANGER AND DRAIN DOWN FOR SOLAR COLLECTOR

This invention relates to a new and inproved heat exchanger and drain down for solar collectors.

Solar collectors are commonly used in exposed areas where there is a definite hazard of freezing. Since the internal constructions of such panels contain tubes, great damage may occur. The present invention provides a tank into which the liquid in the solar panels may drain by gravity whenever the collector pump is inactivated by normal operation or power failure. In normal usage, the device performs its heat exchange function under appropriate thermal controls depending upon whether the liquid in the solar panels or the hot water is at a higher temperature.

Accordingly, the present invention provides in a single device a heat exchanger for normal operation of a solar heating system which is used in combination with a hot water heating system, but in emergencies occasioned by freezing temperatures and particularly when there is an electric power failure (which sometimes coincides with freezing temperatures) provides a convenient tank for gravity drainage of the liquid in the collector.

A further feature of the invention is the fact that by the use of the heat exchanger the liquid in the solar collector is maintained separate from the water in the hot water system.

Another means of preventing freezing damage to solar collectors is to use an anti-freeze solution in the collector system. Unfortunately, many such liquids are toxic and there is always a danger that in the heat exchanger there will be contamination of the potable water supply from the toxic fluids. The present invention makes it possible to use water in the collector system and to eliminate the use of toxic anti-freeze material, thereby reducing possibility of contamination of the water supply.

Other objects of the present invention will become apparent upon reading the following specification and referring to the accompanying drawings in which similar characters of reference represent corresponding parts in each of the several views.

Figure 1:
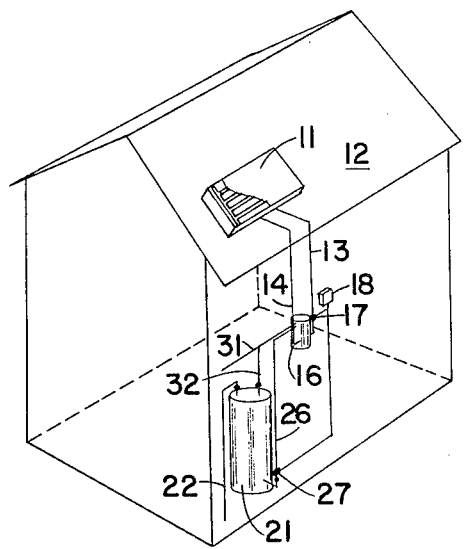
FIG. 1 is a schematic persptive view showing a typical installation of the present invention in a solar heated-hot water heating combination.

One or more solar collectors 11 singly or in series or other combinations are located in an area exposed to sunlight but also, on occasions, exposed to freezing weather. Typically, such panels 11 may be installed on the roof 12 of a residence. The liquid which is circulated through the panels 11 may be water, there being a return pipe 13 which returns cooler water to the panel 11 and an outlet pipe 14 which transmits hot water from the panel 11 to a heat exchanger 16, hereinafter described in detail. After passing through the heat exchanger, the water is pumped by means of pump 17 through the return pipe 13. A differential controller 18, which is commercially available and well understood in this art, is connected to a power line and controls the pump 17. Unfortunately, when freezing weather is likely to damage the collector 11, the power source is likely to be interrupted. Annually, great damage occurs in such instances.

A hot water heater 21 of well known construction is used in the system of the present invention, it being understood that the heater 21 supplements the solar collector 11 in cold weather, and the collector 11 supplements the heater 21 in periods of sunshine, all as well understood in this art. Thus, water under main pressure from main 22 is directed into the tank of heater 21 through shut-off valve 24. The outlet 26 of the tank of heater 21 is connected to a pump 27 also controlled by differential controller 18. Pipe 26 leads to heat exchanger 16. Outlet pipe 31 extends from the heat exchanger 16 to the household water system, swimming pool or whatever location for which the system is designed. Bypass pipe 32 interconnects pipe 31 with the tank 21 and is controlled by a shut-off valve 34. Water may circulate in either direction through the bypass 32. There is a further bypass and a temperature controlled valve 33 between the pipes 31 and 22 to insure that the water flowing into the hot water system of the residence is not too hot.

In a commercially available system, a sensor 36 is installed in pipe 26 near the tank of heater 21, and a second sensor 37 is installed at the discharge of the collector 11. Sensors 36 and 37 are electrically connected into differential controller 18 and determine actuation of pumps 17 and 27. A vacuum breaker 39 may be installed at the outlet of sensor 11 in accordance with common commercial practice.

Figure 2:
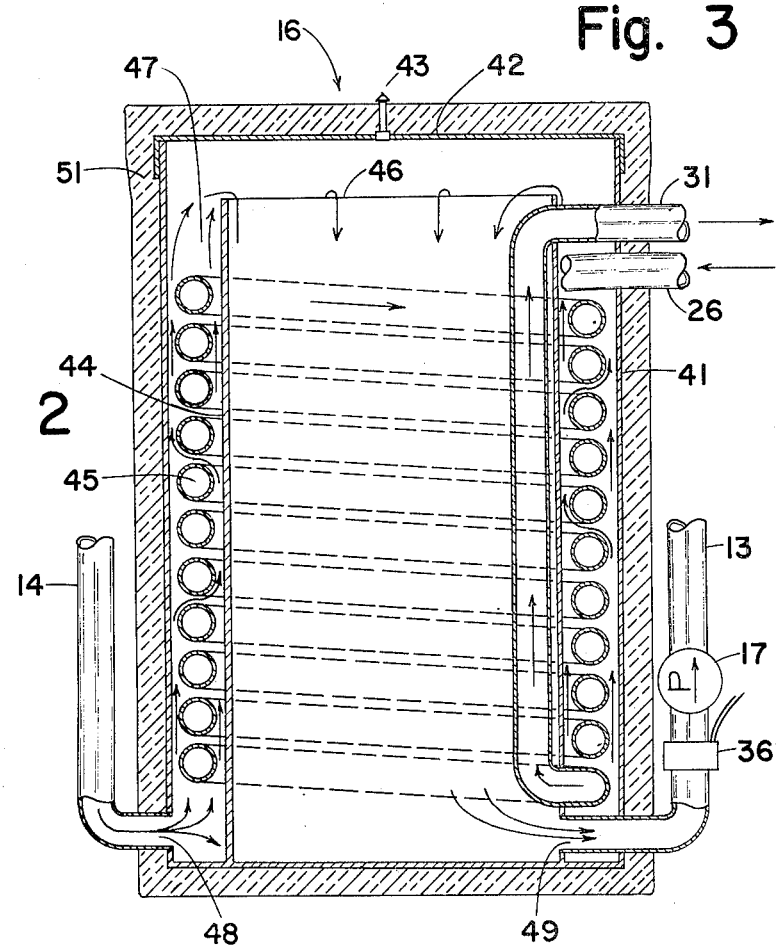
FIG. 2 is an enlarged sectional view through the heat exchanger.

Directing attention now to the heat exchanger 16 shown in detail in FIG. 2, it will be observed that there is an outer tank 41 having a removable cover 42 supplied with a vent 43. Inner tank 44 is of lesser diameter than tank 41 and centrally disposed therein. Tank 44 has an open top 46 spaced below cover 42, and there is an annular space 47 between the tanks 41 and 44. A helical coil of pipe 45 is installed in the annular space 47, one end of coil 45 being connected to pipe 26 and the other to pipe 31. Pipe 14 discharges through port 48 into the bottom of the annular space 47. Inlet port 49 for pipe 13 accepts liquid from the bottom of tank 41. Insulation 51 of conventional type is lapped around the outside of heat exchanger 16.

In normal usage of the system, liquid (preferably water) is forced by pump 17 up pipe 13 through the collector panels 11 and out through pipe 14. The water is discharged from pipe 14 through the port 48 into the annular space 47 and flows up the annular space, exchanging heat with the water in the coil 45. The water in the annular space 47 then overflows the top edge 46 of the inner tank 44. At the bottom of the tank 44 it is picked up by the discharge port 49 and recirculated by pump 17 through the pipe 13. Meanwhile, water from the tank of the water heater 21 is pumped by pump 27 through the pipe 26 down through the coil 45 and up through the pipe 31 to the household water system, swimming pool, etc.

Figure 3:
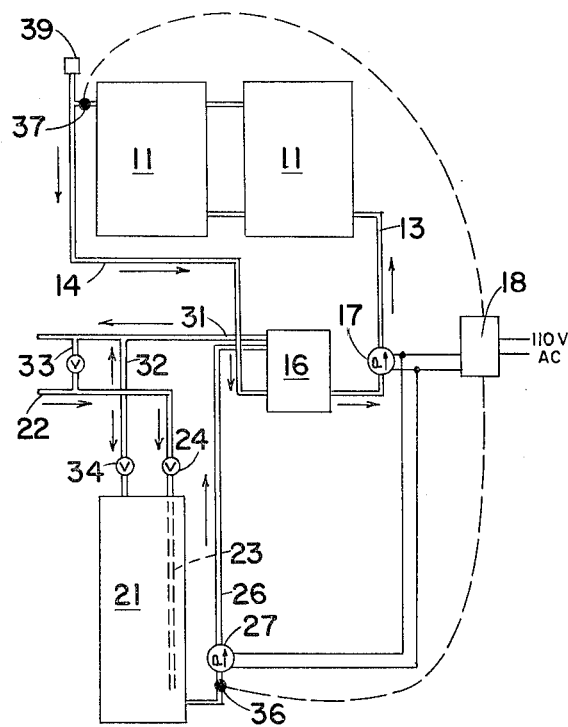
FIG. 3 is a schematic piping and wiring diagram of the installation of FIG. 1.

In the event of a failure of power or the normal operation of the controller 18 which inactivates the pumps 17 and 27, all of the water in the collector 11 drains down through pipe 14, the vacuum breaker 39 facilitating such drainage. The capacity of tank 44 is such as to accommodate all of the water in the solar panels 11. Hence, the tank 44 may be filled with water and the panels 11 completely drained. Normal solar operation causes the controller 18 to reactivate pump 17 and pump 27 and to pump water from the tank 44 back through the collector 11 and to circulate water from the hot water tank 21 thru heat exchange coil 45. In other respects, the system illustrated in FIG. 3 operates the same as conventional solar collector-hot water heated combinations.

The presently preferred embodiment for use of the heat exchanger has been illustrated and described. However, other uses for the combined heat exchanger and drain down are contemplated.

What is claimed is:

1. A heat exchanger and drain down comprising a casing, a tank within said casing and of lesser cross-section than said casing so that a gap exists between said tank and said casing, said tank having an opening at its top communicating with said gap, a first port at the bottom of said casing communicating with said gap, a second port at the bottom of said tank, and heat exchange means for circulating a first liquid for thermal exchange with a second liquid circulating from said first port upward through said gap, through said opening into said tank and out said second port, said heat exchange means being located in said gap, said heat exchange means comprising a helical coil of tubing, said first port, said gap, said tank and said second port comprising a normally closed second liquid system isolated from said first liquid.

2. Apparatus according to claim 1 in which said gap is annular.

3. Apparatus according to claim 1 which further comprises a solar collector having an outlet and an inlet connected to said first and second ports, respectively, and means for circulating said second liquid from said second port, through said collector and back to said first port.

4. Apparatus according to claim 3 in which said solar collector is at a higher elevation than said casing, whereby, upon failure of said means for circulating liquid to operate, liquid in said solar collector drains by gravity down to said first port, up said gap and through said opening into said tank, said tank having a capacity to accommodate substantially all the liquid in said collector.

5. Apparatus according to claim 3 in which said heat exchange means has heat exchanger inlet and an outlet ports and which further comprises a water heater having an heater outlet and heater inlet and piping interconnecting said heater outlet and heat exchanger inlet port and said heat exchanger outlet port and said heater inlet.

6. Apparatus according to claim 5 in which said heat exchanger means comprises a helical coil of tubing located in said gap.

7. Apparatus according to claim 5 in which said heater has a tank under water main pressure and a separate circulating pump, whereby warm water in said tank circulates through said heat exchange means to warm liquid in said tank which has drained from said collector.

* * * * *